United States Patent
Niina

[11] Patent Number: 5,921,684
[45] Date of Patent: Jul. 13, 1999

[54] THRUST BALL BEARING

[75] Inventor: Masatoshi Niina, Kuwana, Japan

[73] Assignee: NTN Corporation, Osaka, Japan

[21] Appl. No.: 08/927,519

[22] Filed: Sep. 11, 1997

[30] Foreign Application Priority Data

Sep. 17, 1996 [JP] Japan .................................. 8-244486

[51] Int. Cl.⁶ .................................................. F16C 33/62
[52] U.S. Cl. ........................ 384/492; 384/490; 384/625
[58] Field of Search ..................................... 384/490, 491, 384/492, 625

[56] References Cited

U.S. PATENT DOCUMENTS

| | | | |
|---|---|---|---|
| 3,677,032 | 7/1972 | Suzuki | 384/276 X |
| 4,696,581 | 9/1987 | Tsushima et al. | 384/491 X |
| 5,147,140 | 9/1992 | Murakami et al. | 384/492 |
| 5,567,508 | 10/1996 | Murakami | 384/490 X |

FOREIGN PATENT DOCUMENTS

| | | |
|---|---|---|
| 0 589 236 | 3/1994 | European Pat. Off. . |
| 0 757 178 | 2/1997 | European Pat. Off. . |

*Primary Examiner*—Thomas R. Hannon
*Attorney, Agent, or Firm*—Nikaido, Marmelstein, Murray & Oram LLP

[57] ABSTRACT

In a thrust ball bearing, the heat treating hardness and heat treatment hardening depth of a bearing ring 4a (4b) are prescribed such that, at any depth from the raceway surface 4a1 (4b1), the value which is seven times the dynamic shearing stress $\tau_{ZY}$ produced at a certain depth from the raceway surface 4a1 (4b1) by the rolling movement of the rolling element 4c does not exceed the hardness at that depth. More particularly, with Vickers hardness Hv=520 adopted as a reference hardness, heat treatment (for example, carburizing) is effected such that a hardened layer with Hv=520 is present at a depth not less than 4% of the diameter d of the balls 4c.

1 Claim, 4 Drawing Sheets dt: HEAT TREATING DEPTH
dw: DIAMETER OF ROLLING ELEMENT z: DEPTH FROM RACEWAY SURFACE
dw: DIAMETER OF ROLLING ELEMENT

THRUST BALL BEARING

BACKGROUND OF THE INVENTION

The present invention relates to a thrust ball bearing to be interposed between two members which make an eccentric rotary movement therebetween as in the case of a revolving scroll member and a stationary scroll member in a scroll compressor.

For example, a scroll compressor, as shown in FIG. 5, comprises a revolving scroll member 11 and a stationary scroll member 12 which are respectively provided with screw-like partition walls 11b and 12b, the arrangement being such that a compression chamber P defined between the screw-like partition walls 11b, 12b is caused to change in volume as the eccentric rotary movement of the revolving scroll member 11 (scroll rotation) relative to the stationary scroll member 12 proceeds, thereby compressing the fluid in the compression chamber P.

The axis of the revolving scroll member 11 and the axis of a driving motor 15 are shifted from each other by an amount of eccentricity e, so that when an output shaft 15a of the driving motor 15 is rotated, the revolving scroll member 11 makes an eccentric rotation with a revolving radius which is equal to the eccentricity e. At this time, the revolving scroll member 11 is acted on by a force which causes it to rotate around its own axis, while it is also subjected to a thrust load which attends the compression of the fluid. Thus, in order to prevent the revolving scroll member 11 from rotating around its own axis and to support the thrust load, a thrust ball bearing 14 is interposed between the revolving scroll member 11 and the stationary scroll member 12 (in the illustrated arrangement, a stationary frame 13 fixed to the stationary scroll member 12).

The thrust ball bearing 14 is comprised of a pair of bearing rings 14a, 14b of the same shape, and a plurality of balls 14c interposed between these bearing rings 14a, 14b. The bearing rings 14a, 14b are fixed to respective axially opposed mounts 11a and 13a of the revolving scroll members 11 and the stationary frame 13.

As shown in FIG. 6, one end surface of the bearing ring 14a (14b) is formed with a plurality of raceway surfaces 14a1 (14b1) on the same circumference. Each raceway surface 14a1 (14b1) is annular and, with eccentric rotation of the revolving scroll member 11, the balls 14c roll on the pitch circles PCD of the raceway surfaces 14a1 (14b1). The diameter d of the pitch circle PCD of each raceway surface 14a1 (14b1) is equal to the eccentricity e.

The bearing ring 14a (14b) of the shape described above is produced, for example, from a steel sheet blank through a series of processing steps: press work→heat treatment (for example, carburizing)→finishing of the raceway surfaces 14a1 (14b1).

Generally, it is known that when a rolling bearing is rolling under a load, repetitive stress on the rolling contact surface produce cracks in the material, leading to flaking (separation into flakes due to fatigue), causing the expiration of the rolling contact life.

It is therefore an object of the invention to suppress the flaking of the raceway surfaces (rolling contact surfaces) of a thrust ball bearing of the type described above so as to increase the rolling contact life.

SUMMARY OF THE INVENTION

It has been observed through many experiences that most of the cracks in the material which are the starting points of flaking take place in a region lying a little inside the rolling contact surface. In the past, it was believed that as these cracks grew at an angle of inclination of 45° with respect to the rolling contact surface into flakes and that the maximum value $\tau_{45°}$ (shearing stress acting on a plane inclined at an angle of 45° with respect to the rolling contact surface) of the static shearing stress $\tau_{ST}$ governed the rolling contact life. Recently, however, it has been confirmed that cracks in the interior of the material which provide starting points of flaking grow, not at an angle of inclination of 45° with respect to the rolling contact surface but substantially in parallel with respect to the surface, and it has been believed that it is the maximum value $\tau_0$ of the dynamic shearing stress $\tau_{ZY}$ produced by the rolling movement that governs the rolling contact life.

As shown in FIG. 2, the dynamic shearing stress $\tau_{ZY}$ produced by rolling movement exhibits positive and negative changes of the same absolute value as the rolling movement of the rolling elements proceeds. When an intermediate point p between load points P1 and P2 is considered, it is seen that with a passage of time (time T2−T1), a stress amplitude twice as great as the maximum shearing stress $\tau_0$ is acting. In contrast, the static shearing stress $\tau_{ST}$ is substantially one-sided, its amplitude being less than $2\tau_0$; ($\tau_{45°} < 2\tau_0$).

The present invention is intended to provide an arrangement wherein concerning at least one of the pair of bearing rings of a thrust ball bearing which make an eccentric rotary movement therebetween, at any depth from the raceway surface thereof, the value which is seven times the dynamic shearing stress $\tau_{ZY}$ produced at a certain depth from the raceway surface does not exceed the hardness at that depth, thereby suppressing the flaking of the raceway surfaces and improving the rolling contact life.

FIG. 3 shows the result of a life test of this type of thrust ball bearings conducted by changing the heat treating depth of the bearing rings (a heat treating condition typified by heat treating duration). In the same figure, the heat treating depth depicted on the horizontal axis is indicated by a value (dt/dw) obtained by dividing the heat treating depth dt by the diameter dw of the rolling elements. Further, the heat treating depth dt means a depth at which there is a hardened layer with a Vickers hardness Hv=520. For example, in the case of dt/dw=0.04, there is a hardened layer with Hv=520 at a depth of 0.04 dw from the raceway surface. The conditions under which the test was conducted were number of revolution n=1700 rpm, axial load=1578 kgf, splash oiling, lubricating oil viscosity=10 cst, being severer than the usual working conditions (the working conditions used in actual machines).

As shown in the same figure, when the heat treating depths (dt/dw) were 0.024 and 0.038, flaking occurred in a short time, causing the expiration of the life, whereas when the heat treating depth (dt/dw) was 0.046, there was observed no trace of flaking even 250 hours later, and the life was lengthened to a great extent. This proves that it is possible to increase the rolling contact life of raceway surfaces to a great extent by performing the heat treatment in such a manner as to ensure the presence of a hardened layer with a Vickers hardness Hv=520 at a depth which is not less than 4$ of the diameter dw of the rolling element.

FIG. 4 shows a hardness distribution Hv and a distribution of the dynamic shearing stress $\tau_{ZY}$ taken in a vertical section passing through the pitch circle PCD of the raceway surface. In this figure, the depth depicted on the horizontal axis indicates a value (z/dw) obtained by dividing the depth z measured from the raceway surface by the diameter dw of he rolling element. The hardness distribution curves correspond to heat treating depths (dt/dw) of 0.024, 0.038, and 0.046 in FIG. 3 respectively. As shown in the same figure, in the case of (dt/dw)=0.024 and 0.038 for which the life was short, the value (7 $\tau_{ZY}$) which is seven times the dynamic shearing stress $\tau_{ZY}$ exceeds the hardness distribution curves, whereas in the case of (dt/dw)=0.046 for which a great increase in life was observed, at any depth the value 7$\tau_{ZY}$ was less than the values provided by the hardness distribution curves. Further, a similar tendency was exhibited when tests were conducted by changing the heat treating depth (dt/dw) to other values than the aforesaid values. This proves that it is possible to increase the rolling contact life of raceway surface to a great extend by provided an arrangement wherein, at any depth from the raceway surface, the value which is seven times the dynamic shearing stress $\tau_{ZY}$ produced at a certain depth by the rolling movement of the rolling element does not exceed the hardness at that depth.

In this connection, even if the heat treating conditions typified by the heating time are changed, as shown in FIG. 4, there is no great change in the shape of the hardness distribution curves, the latter being only vertically moved up and down (the surface hardness HV of this type of raceway surface being 700 or thereabouts, not varying greatly), so that if a depth at which a hardness on a certain basis appears is specified, it is possible to infer the hardness distribution curve. In this sense, the aforesaid requirement that "a hardened layer with Vickers hardness HV=520 be present at a depth which is not less than 4% of the diameter dw of the rolling element" is, in other words, tantamount to specifying a hardness distribution curve. For example in FIG. 4, it is only the hardness distribution curve for (dt/dw)=0.046 that satisfies the above requirement. Of course, it is possible to adopt a hardness value other than Hv=520 as a reference, and depending on this, the prescribed value (4% mentioned above) also changes.

DESCRIPTION OF THE PREFERRED EMBODIMENTS

An embodiment of the invention applied to a thrust ball bearing used in a scroll compressor will now be described.

Figure 1A:
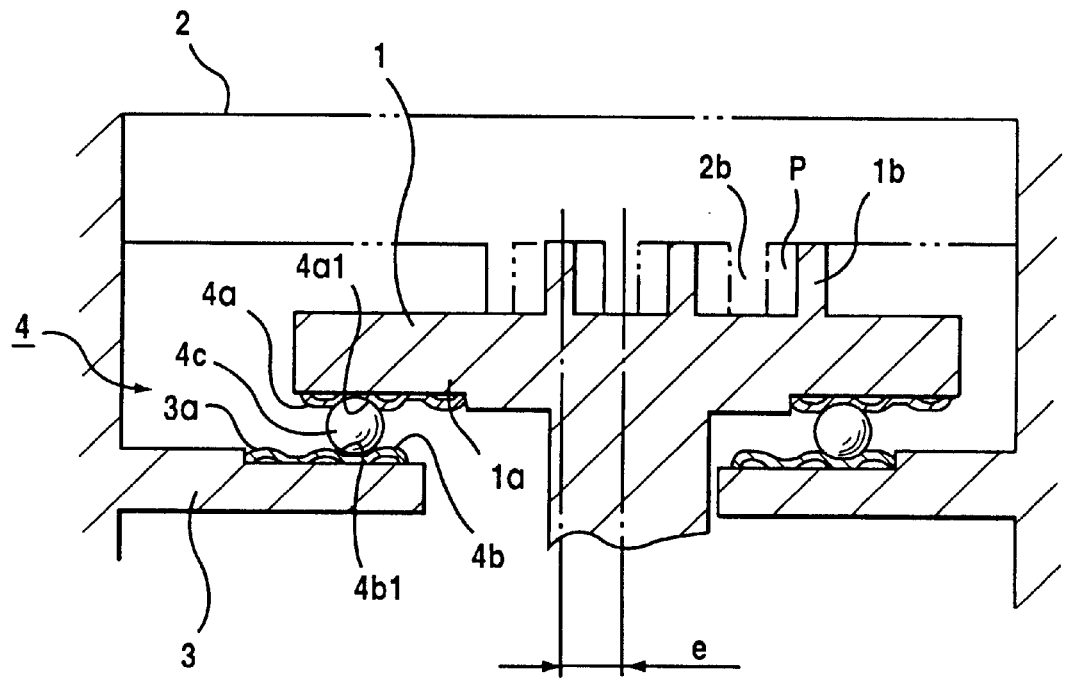
FIG. 1A is a sectional view showing the peripheral region of a thrust ball bearing in a scroll compressor.
Figure 1B:
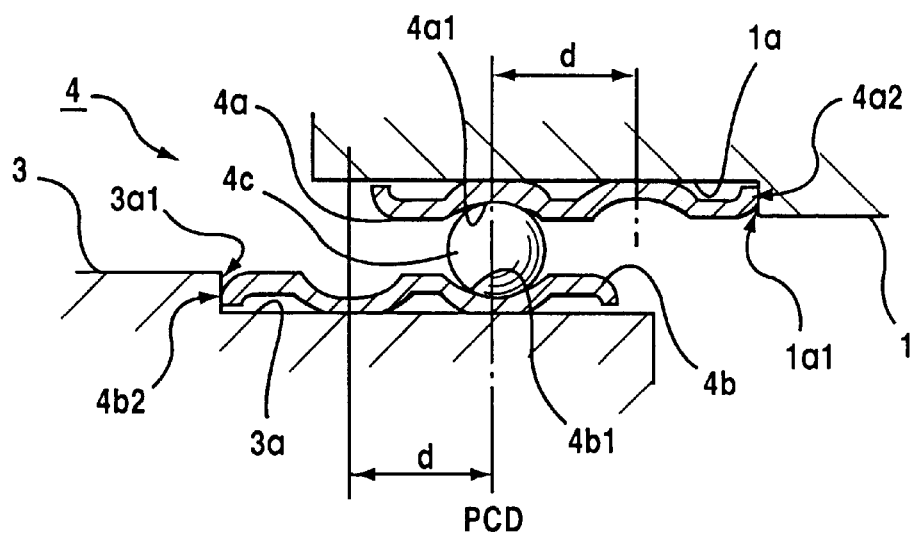
FIG. 1B is an enlarged sectional view showing the vicinity of the thrust ball bearing.
Figure 2:
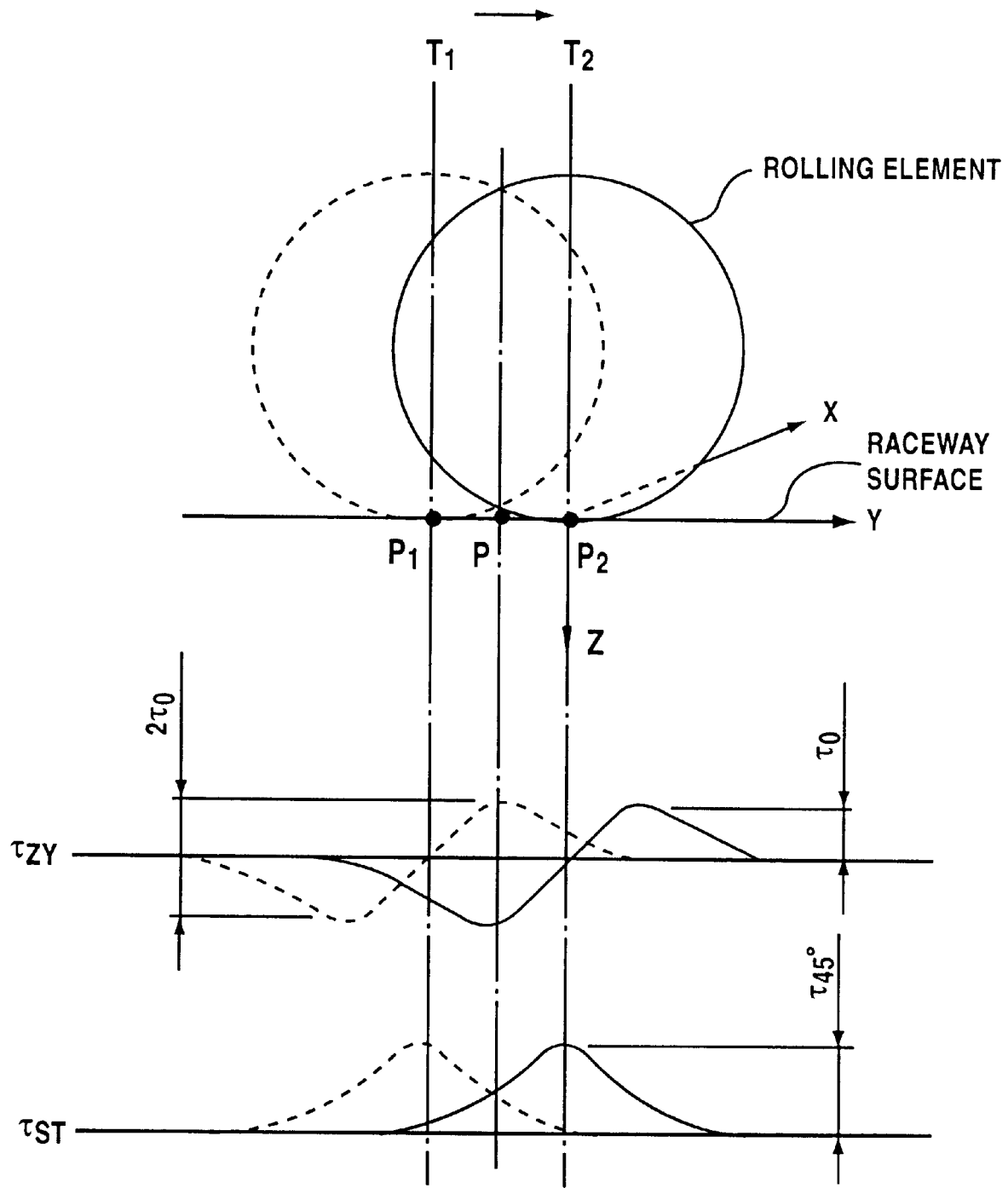
FIG. 2 is a view for explaining the dynamic shearing stress $\tau_{ZY}$ resulting from rolling movement.
Figure 3:
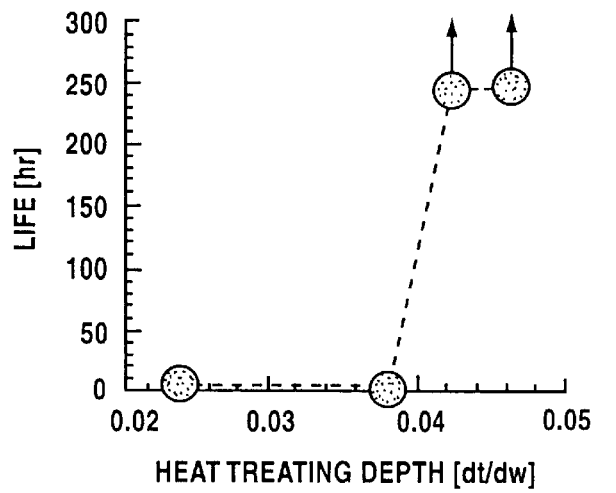
FIG. 3 is a graph (test result) showing the relationship between the heat treating depth and the rolling.related life.
Figure 4:
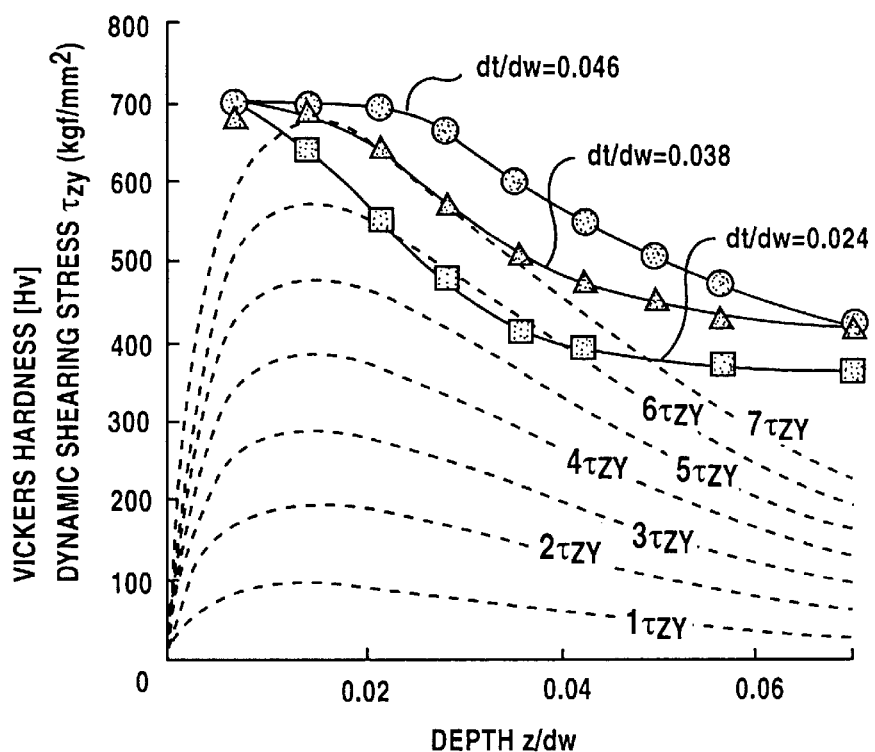
FIG. 4 is a graph showing the relationship between the depth, Vickers hardness and dynamic shearing stress $\tau_{ZY}$.
Figure 5:
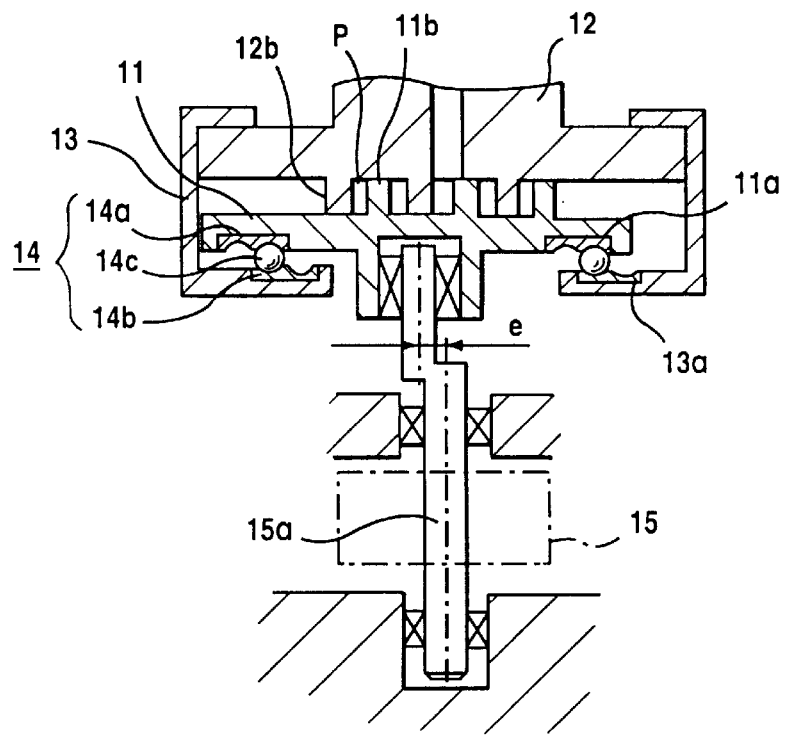
FIG. 5 is a graph showing a general form of scroll compressor.

FIGS. 1A and 1B show the peripheral region of a thrust ball bearing 4 used in a scroll compressor as shown in FIG. 5. A pair of bearing rings 4a, 4b of the thrust ball bearing 4 are fixed to axially opposed mounts 1a, 3a of a revolving scroll member 1 and stationary frame 3 (the stationary frame 3 being fixed to a stationary scroll member 2), and balls 4c are disposed between a plurality of recessed raceway surfaces 4a1, 4b1 formed on the pair of bearing rings 4a, 4b. The revolving scroll member 1 makes an eccentric rotary movement (scroll rotation) with a revolving radius which is equal to an eccentricity e with respect to the stationary scroll member 2, whereby a compression chamber P defined between their spiral partition walls 1b, 2b changes in volume, thereby compressing the fluid therein. During such compressing action, the thrust ball bearing 4 serves to prevent the revolving scroll member 1 from rotating around its own axis and also to support the thrust load. In this embodiment, the mounts 1a, 3a are each step-like, so that the inner periphery 4a2 of the bearing ring 4a associated with the revolving side is fitted in the shoulder 1a1 of the mount 1a, while the outer periphery 4b2 of the bearing ring 4b associated with the stationary side is fitted in the shoulder 3a1 of the mount 3a.

The bearing ring 4a (4b) is of the same shape as that of the conventional bearing ring 14a (14b) and is produced, for example, from a steel sheet blank through a series of processing steps: press work→heat treatment (for example, carburizing)→finishing. The raceway surfaces 4a1 (rb1) are annular, and disposed on the same circumference of one end surface of the bearing ring 4a (rb). The balls 4c disposed on the raceway surfaces 4a1 (4b1) roll on the pitch circles PCD of the raceway surfaces 4a1 (4b1) as the eccentric rotation of the revolving scroll member 1 proceeds. The diameter d of the pitch circle PCD of each raceway surface 4a1 (4b1) is equal to the eccentricity e.

Figure 6:
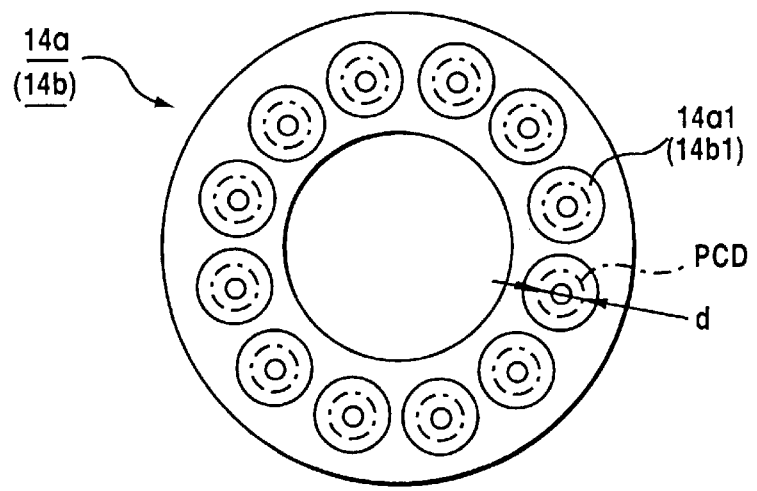
FIG. 6 is a plane view showing a bearing ring of a conventional thrust bearing.

What differentiates the thrust ball bearing 4 of this embodiment from the conventional type shown in FIGS. 5 and 6 is that the heat treating hardness and heat treating depth of the bearing ring 4a (4b) is specified such that, at any depth from the raceway surface 4a1 (4b1), the value which is seven times the dynamic shearing stress $\tau_{ZY}$ produced at a certain depth measured from the raceway surface 4a1 (4b1) by the rolling movement of the balls 4c does not exceed the hardness at that depth. More particularly, with Vickers hardness Hv=520 adopted as a reference hardness, heat treatment (for example, carburizing) was effected such that a hardened layer with Hv=520 was present at a depth greater than 4% of the diameter d of the balls 4c. Thereby, the rolling contact life of the raceway surfaces 4a1 (4b1) can be greatly increased.

In addition, the invention is not limited to a thrust ball bearing for scroll compressors but is applicable to thrust ball bearings in general which support thrust loads as they are interposed between two members which make an eccentric rotary movement therebetween.

As has been described so far, according to the invention, the rolling contact life of the raceway surfaces of bearing rings can be greatly increased, whereby a thrust ball bearing of superior durability is provided.

What is claimed is:

1. A thrust ball bearing comprising a pair of bearing rings which make an eccentric rotary movement therebetween, and rolling elements interposed between raceway surfaces formed on the bearing rings, wherein concerning at least one of the pair of bearing rings, at any depth from the raceway surface thereof, the value which is seven times the dynamic shearing stress $\tau_{ZY}$ produced at a certain depth from the raceway surface by rolling movement of the rolling element does not exceed the hardness thereof at that depth.

* * * * *

UNITED STATES PATENT AND TRADEMARK OFFICE
CERTIFICATE OF CORRECTION

PATENT NO. : 5,921,684

DATED : July 13, 1999

INVENTOR(S) : NIINA

It is certified that error appears in the above-identified patent and that said Letters Patent is hereby corrected as shown below:

Claim 1, Column 4, delete lines 56-64 and insert therefor

-- 1. A thrust ball bearing used in a scroll compressor comprising: a first bearing ring fixed to a revolving scroll member, the first bearing ring being produced by press working and formed with a plurality of recessed annular raceway surfaces, the first bearing ring making an eccentric rotary movement together with the revolving scroll member; a second bearing ring fixed to a stationary member, the second bearing ring being produced by press working and formed with a plurality recessed annular raceway surfaces; and a plurality of balls interposed between the raceway surfaces of the first bearing ring and the second bearing ring axially opposed to each other, wherein concerning at least one of the first bearing ring and the second bearing ring, the value which is seven times the dynamic shearing stress $\tau_{zy}$ (kgf/mm$^2$) at a certain depth from the raceway surface produced by rolling movement of the ball does not exceed Vickers hardness Hv at that depth, and wherin a hardened layer with Vickers hardness Hv = 520 is present at a depth from the raceway surface being not less than 4% of the diameter of one of the plurality of balls. --

UNITED STATES PATENT AND TRADEMARK OFFICE
CERTIFICATE OF CORRECTION

PATENT NO. : 5,921,684
DATED : July 13, 1999
INVENTOR(S) : NIINA

It is certified that error appears in the above-identified patent and that said Letters Patent is hereby corrected as shown below:

exceed Vickers hardness Hv at that depth, and wherin a hardened layer with Vickers hardness Hv = 520 is present at a depth from the raceway surface being not less than 4% of the diameter of one of the plurality of balls. --

Signed and Sealed this

Eighteenth Day of January, 2000

Attest:

Q. TODD DICKINSON

Attesting Officer

Commissioner of Patents and Trademarks